June 15, 1954 — G. W. BAKER — 2,681,127
NAIL RECEIVING STRUCTURAL FRAME MEMBER
Filed May 29, 1948 — 3 Sheets-Sheet 1
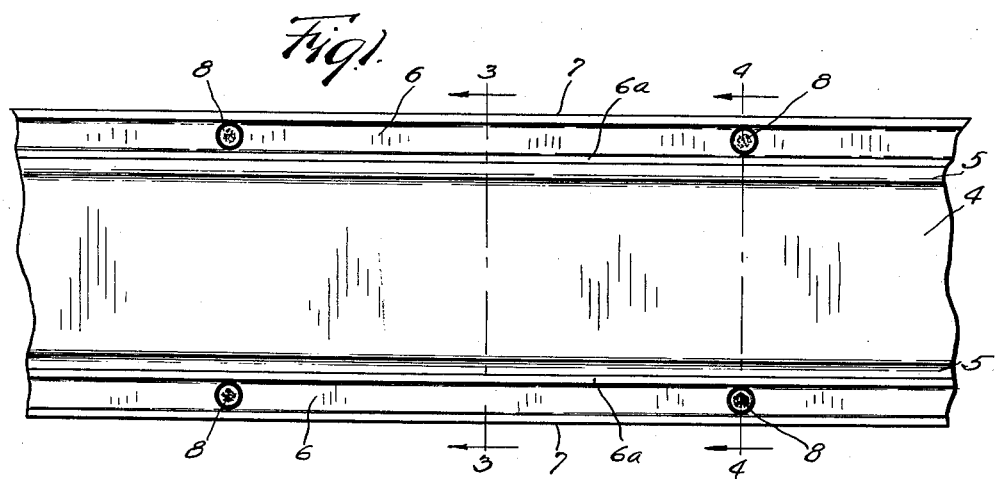
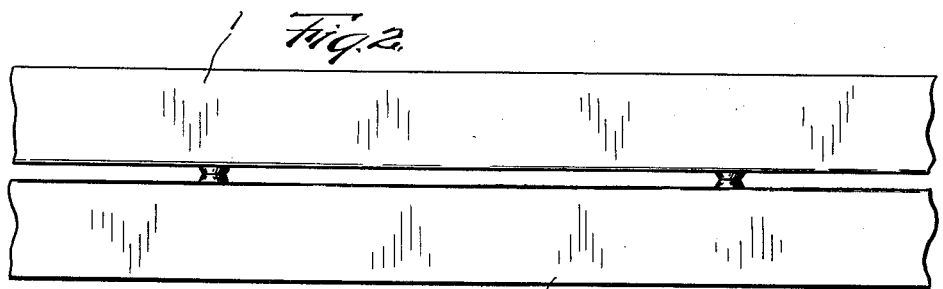
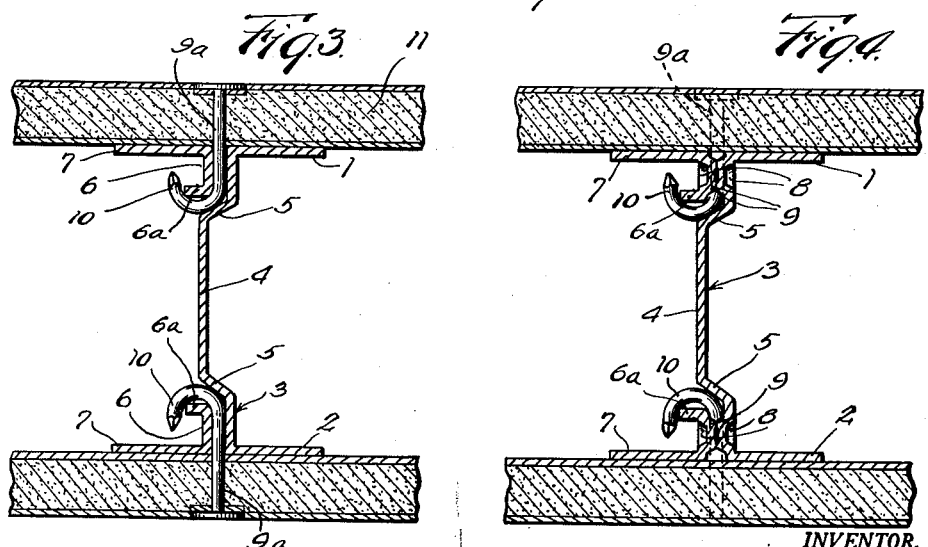
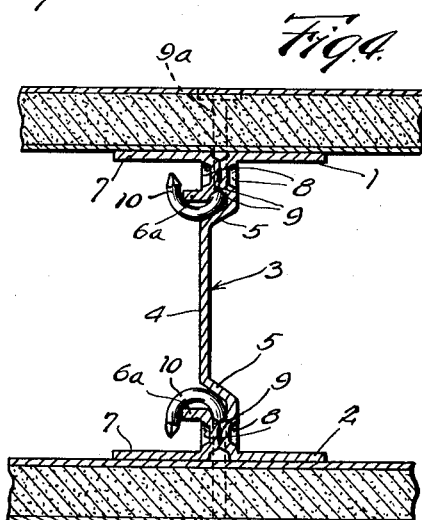
INVENTOR.
George W. Baker
BY Thiss, Olson & Mecklenburger
Attys.

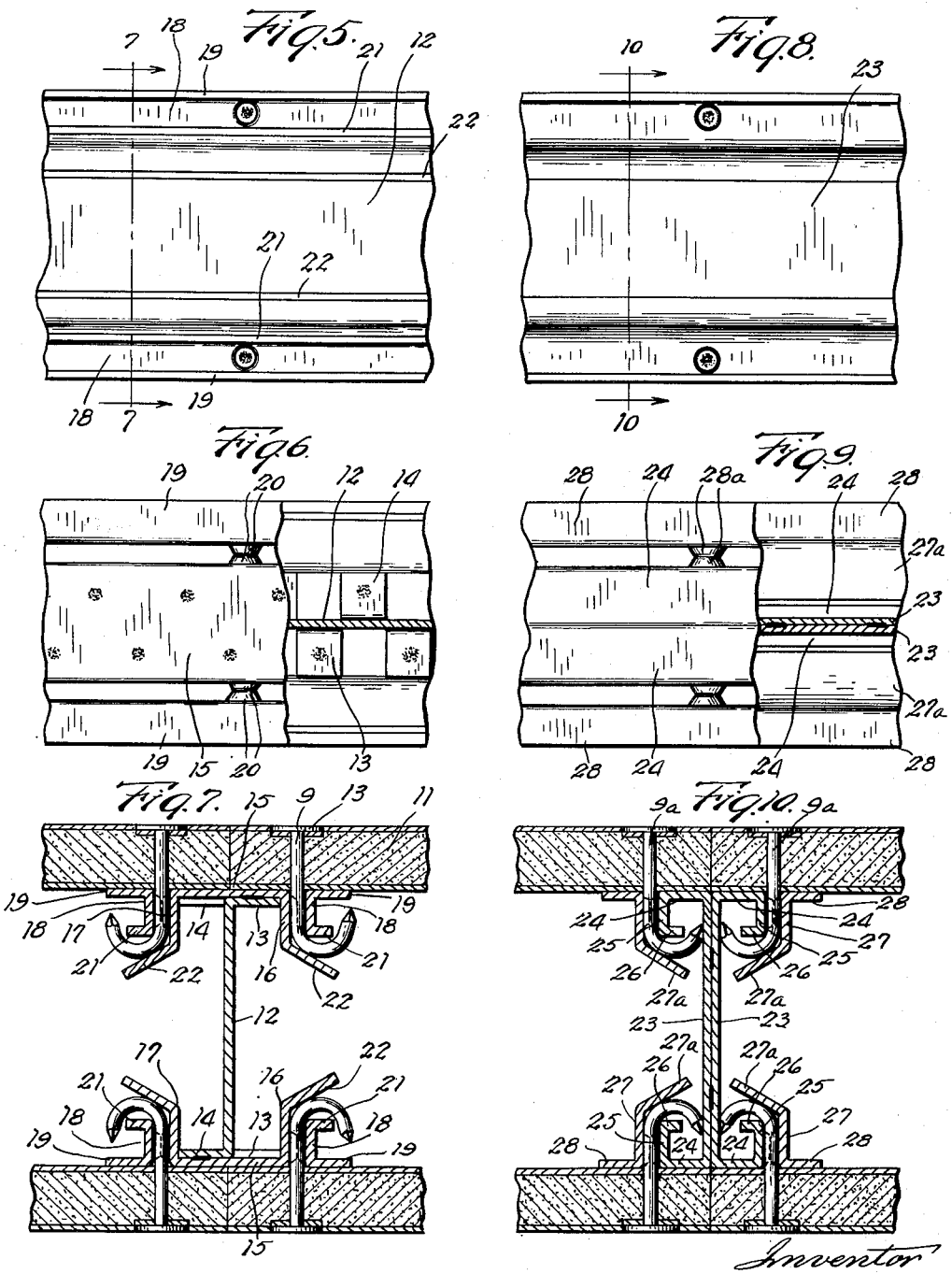

June 15, 1954          G. W. BAKER          2,681,127
NAIL RECEIVING STRUCTURAL FRAME MEMBER
Filed May 29, 1948          3 Sheets-Sheet 3
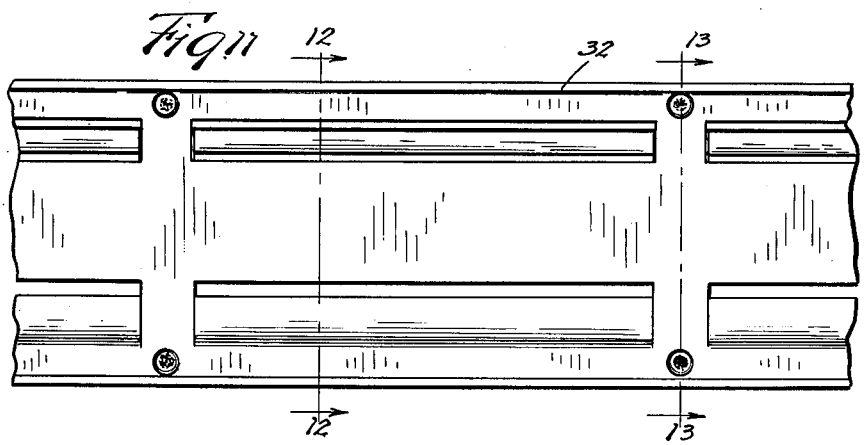
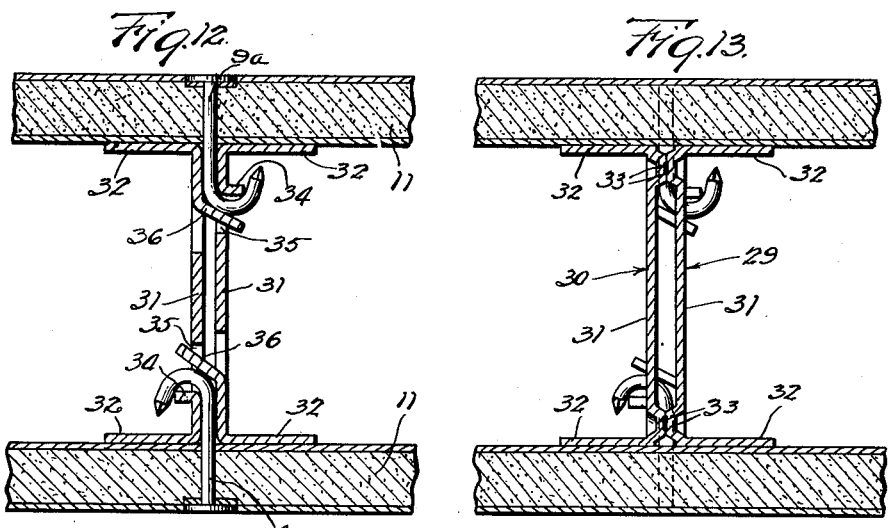
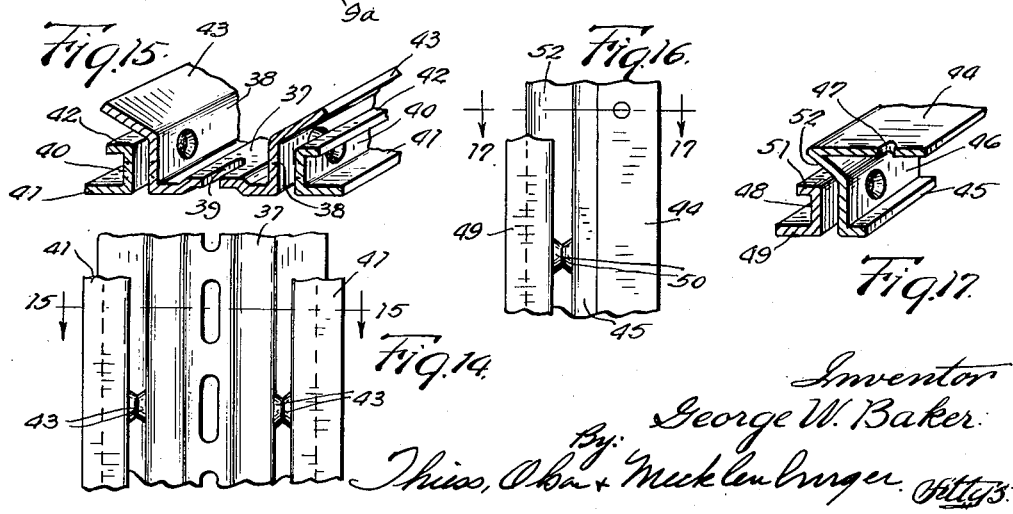
Inventor
George W. Baker
By Thiess, Olson & Mecklenburger Attys Patented June 15, 1954

2,681,127

UNITED STATES PATENT OFFICE 2,681,127

NAIL RECEIVING STRUCTURAL FRAME MEMBER

George W. Baker, Chicago Heights, Ill., assignor to United States Gypsum Company, Chicago, Ill., a corporation of Illinois Application May 29, 1948, Serial No. 29,968

13 Claims. (Cl. 189—34)

The present invention relates to wall element supporting members and has special reference to structural frame members such as studs, joists, furring strips and the like.

More particularly, this invention relates to structural frame members to which plaster laths, gypsum or fiber wallboards, sheathing and other types of wall elements may be secured by nails or similar securing means.

The structural frame members are provided with bearing or positioning surfaces against which the wall elements are secured by nails or naillike securing members that pass through the wall elements and into nail receiving channels in the frame members. Deflecting surfaces are positioned at the inner ends of these channels in the paths of the nails and are arranged to deflect the inner ends of the nails as they are driven into said channels and to cause them to be bent substantially in the shape of a hook, preferably about ledges extending from a side of the channels. The nails, with their inner ends hooked about a ledge, are securely held with respect to the structural frame into which they are driven, irrespective of any frictional engagement between the nails and the channel sides.

It is an object of this invention to provide structural frame members for fixedly positioning and supporting wall elements.

Another object is to provide structural frame members having nail receiving channels with means adjacent the inner ends of the channels for deflecting the inner ends of the nails driven into the channels and bending them into substantially the shape of a hook.

A further object is to provide structural frame members of the above specified type having rigid ledges about which the inner ends of the nails may be hooked.

Still another object is to provide such structural frame members which may have conduits or other partition accessories passing therethrough without interfering with the nailing of wall elements to the members.

Further objects and advantages will be apparent from the following description and claims when considered with the accompanying drawings, in which Fig. 1 is a side elevational view of a stud embodying the present invention;

Fig. 2 is a face view of the stud shown in Fig. 1;

Fig. 3 is a cross sectional view taken on the line 3—3 of Fig. 1;

Fig. 4 is a cross sectional view taken on the line 4—4 of Fig. 1;

Fig. 5 is a side elevational view of a modified form of stud;

Fig. 6 is a face view of the stud shown in Fig. 5 with a portion broken away;

Fig. 7 is a cross sectional view taken on the line 7—7 of Fig. 5;

Fig. 8 is a side elevational view of another form of stud embodying the present invention;

Fig. 9 is a face view of the stud shown in Fig. 8 with a portion broken away;

Fig. 10 is a cross sectional view taken on the line 10—10 of Fig. 8;

Fig. 11 is a side elevational view of still another form of stud embodying the present invention;

Fig. 12 is a cross sectional view taken along the line 12—12 of Fig. 11;

Fig. 13 is a cross sectional view taken along the line 13—13 of Fig. 11;

Fig. 14 is a face view of a double channel member embodying the present invention;

Fig. 15 is a cross sectional view taken along the line 15—15 of Fig. 14 shown in perspective;

Fig. 16 is a face view of a furring member, and

Fig. 17 is a cross sectional view taken along the line 17—17 in Fig. 16 shown in perspective.

Referring to the drawings in detail the embodiment illustrated in Figs. 1–4 comprises a sheet metal stud formed from a channel member and a pair of angle members. The channel member comprises a pair of opposed substantially parallel flanges 1 and 2 connected by a web member 3. The central portion 4 of the web 3 is offset in a direction away from the flanges 1 and 2 and is connected to the rest of the web by deflecting portions or surfaces 5. Each of the angle members consists of a web portion 6 and a flange portion 7 substantially normal thereto. The ends of the web portions 3 of the channel member and the web portions 6 of the angle members are dimpled as indicated at 8 to form opposed projections 9. The angle members are secured to the channel members preferably by welding the faces of the projecting members 9 together. The projections 9 are of such size that, intermediate the projections, the webs 3 and 6 of the channel and angle members respectively will form nail receiving channels of substantially the width of the nails to be used therewith. If desired, the channels may be of a width to frictionally receive the nails. With the parts secured together, the flanges 1 and 2 of the channel member extend opposite to and are coplanar with the flanges 7 of the two angle members.

The inwardly extending webs 6 of the angle members are substantially narrower than the length of the nail portions to be driven into the channels, as shown particularly in Figs. 3 and 4. The inner edge portions of the webs 6 are bent in a direction away from the webs 3 of the channel members, preferably substantially parallel to the flanges 7 of the angle members, forming narrow ledge portions 6a. The web portions 3 of the channel members, preferably extend inwardly from the flanges 1 and 2 a slight distance beyond the ledge portions 6a, before joining the deflecting surfaces 5 which extend inwardly and across the nail receiving channels in the path of the nails, or similar securing members 9a. The deflecting surfaces 5, preferably extend diagonally across the channel but, if desired, may be somewhat rounded. The angularity of the deflecting surfaces at the points of contact with the nails 9a is such, that as a nail is driven into the channel, the pointed end thereof will be curved into substantially the shape of a hook, as shown at 10, with the end hooked about a ledge 6a of one of the angle members. The portions of the deflecting faces 5 contacted by the nails 9a preferably lie in planes at angles of from about 30° to about 60° with the plane in which the adjacent flanges lie, it being apparent that the smaller the angle the more tightly the end of the nail will be hooked.

In the various drawings, gypsum wallboards are shown as being secured to and supported by the various frame members. To secure a gypsum board to the studs illustrated in Figs. 1–4, nails 9a are driven straight through the wallboard 11 and into the channels formed between the webs 3 and 6 until the inner ends engage the deflecting surfaces 5. Thereafter, as the nails are driven home, the ends 10 are hooked about the ledges 6a and may be in contact therewith. When thus secured in the frame members, the nails are tightly held and will not become loosened therefrom.

In Figs. 5, 6 and 7 a double type hook nail stud is disclosed. This stud comprises a central web 12 having the opposite side portions slit inwardly and then bent to form oppositely extending flange portions 13 and 14 as shown particularly in Figs. 6 and 7. Positioned over the flanged portions 13 and 14 at each end of the web 12 is a channel member having a central web 15 lying over and preferably welded to the flange portions 13 and 14, and inwardly extending flange portions 16 and 17 lying substantially parallel to the central web 12. Positioned adjacent the outer sides of the flange members 16 and 17 of the channel members are angle members comprising web portions 18 and flanges 19. The webs 18 and flanges 16 and 17 are dimpled to provide opposed projecting portions 20 which are welded together to secure the angle members to the channel members with the flanges 19 extending away from and being coplanar with the webs 15 of the channel members, and the webs 18 of the angle members spaced from the flanges 16 and 17 of the channel member to form nail receiving channels substantially normal to the flanges 19.

The inner edges of the angle member webs 18 are bent outwardly, preferably substantially parallel to the flanges 19, forming narrow ledges 21. The flanges 16 and 17 of the channel member extend inwardly preferably a slight distance beyond the ledges 21 and then are bent substantially diagonally across the inner end of the nail receiving channels to form deflecting surfaces 22 for causing the nails 9a driven through the gypsum wallboard 11 and into the nail receiving channels to be hooked about the ledges 21.

Another double type nail receiving stud is disclosed in Figs. 8–10. This type comprises a pair of similar channel members, having webs 23 and flanges 24 at each edge, secured back to back with the portions of the flanges 24 adjacent the webs extending oppositely and with the flanges at opposite edges coplanar. Each of the flanges 24 of the channel members extends for a distance substantially normal to its webs and then extends inwardly toward its opposed flange forming a portion 25 substantially parallel to the web 23. The free edge of each portion 25 is bent toward its web, preferably substantially parallel to the flange portions 24, resulting in a narrow ledge 26. The channel members thus have nearly closed rectangular spaces at each edge formed by the web portions 23, flange portions 24 and 25 and ledge 26.

Angle members having web portions 27 and flanges 28 substantially normal thereto are arranged adjacent each of said rectangular portions. For this purpose, the inwardly extending flange portions 25 of the channels and the webs 27 of the angle members are dimpled to provide opposed projecting portions 28a which are preferably welded together. Thus, nail receiving channels are formed between the flange portions 25 and the webs 27 intermediate the projections 28a. The angle member flanges 28 are arranged coplanar with the flange portions 24 of the channel members and extend outwardly therefrom.

The angle member webs 27 extend inwardly preferably slightly beyond the ledge portions 26 and then are bent diagonally inwardly across the nail receiving channels forming deflecting surfaces 27a arranged to be engaged by the ends of the securing nails and bend them in the form of a hook about the ledge 26.

Still another form of stud embodying the present invention is illustrated in Figs. 11–13. These studs are formed from two channel members 29 and 30, each of which comprises a web 31 and opposed substantially parallel flanges 32. The web portions adjacent each of the flanges 32 are dimpled to form projections 33 extending oppositely to the flanges 32. The projections 33 are preferably welded together to form nail receiving channels at opposite sides of the stud, as illustrated particularly in Fig. 12.

Each of the webs extends inwardly a distance from its corresponding flange 32 and is then provided with a longitudinal struck-out portion 34 bent outwardly in the direction of its adjacent flange 32 to form a narrow ledge. An opening 35 is provided in each of the web portions 31 adjacent the ledge 34. The other edge portion of each of the webs 31 extends inwardly a slight distance beyond its adjacent ledge portion 34 and is then bent diagonally across the nail receiving channel and through the opening 35 in the adjacent web forming a deflecting surface 36 in the path of the nails driven into the channels. These deflecting surfaces cause the inner ends of the nails to hook about the ledges 34 in the same manner as described in connection with the studs previously discussed herein. With the arrangement just described the nails 9a, after passing through the wallboards 11 and entering the nail receiving channels are hooked about the corresponding ledges.

A double hook nail channel is shown in Figs. 14 and 15. It comprises a channel member having a web 37 and opposed flanges 38 at opposite sides of the web. The web 37 is provided with longitudinal openings 39 to facilitate securing it to a supporting structure by any suitable means. An angle member having a web 40 and a flange 41 preferably normal thereto is arranged adjacent each of the flanges 38 of the channel member. For this purpose, the webs 40 and flanges 38 are dimpled to provide cooperating projections 43 which are preferably welded together with the angle flanges 41 coplanar with and extending outwardly from the web 37 of the channel member and the angle member webs 40 spaced from the channel flanges 38 forming nail receiving channels therebetween. The webs 40 extend inwardly from the flanges 41 of the angle members a distance substantially less than the length of the nail portions to be received in the frame member and the edges of these webs are bent outwardly, preferably substantially parallel to the flanges 41, forming narrow ledges 42. The flanges 38 of the channel member extend inwardly, preferably slightly beyond the ledges 42, and are then bent diagonally across the nail receiving channels forming deflecting surfaces 43 which, upon being engaged by the inner end of the nails driven into the channels, cause them to be hooked about the ledges 42.

A furring construction is shown in Fig. 17. This construction comprises a channel member having a wide inner flange 44, and a narrow outer flange 45 connected by a web 46. The flange 44 is intended to be positioned against a supporting structure and holes 47 are provided therein to receive securing means for this purpose. An angle member having a web 48 and an outer flange 49 substantially normal thereto is associated with the channel member. The web 46 of the channel member and the web 48 of the angle member are dimpled to form cooperating projecting members 50 which are preferably welded together, thus maintaining the webs 46 and 48 in spaced parallel relation to form nail receiving channels, and the flanges 45 and 49 coplanar and extending in opposite directions. The inner edge of the web 48 is bent outwardly away from the web 46 and preferably substantially parallel to the flange 49 forming a narrow ledge 51. The web 46 extends inwardly preferably slightly beyond the ledge 51 and then extends diagonally across the nail receiving channel forming a deflecting portion 52. With this construction, when a nail is driven into the nail receiving channel the point will strike the deflecting surface 52 and the inner end of the nail will be hooked about the ledge 51.

With the constructions hereinabove described, nails or nail-like securing members, all of which are included in the term "nails," pass through the wall elements to be secured and into the nail receiving channels of the frame members. The inner ends of the nails, due to the deflecting surfaces positioned across the inner ends of the nail receiving channels, are caused to hook about the ledges, thus making it extremely difficult for the hooked nails to be removed from the frame members.

In each of the constructions shown, the frame comprises a pair of longitudinally extending angle portions. These may be angle members or the edge portions of the channel members consisting of a channel flange and the adjacent web portion.

Although the web portions forming the sides of the nail receiving channels are shown as being substantially flat, they may be curved or bent to form channels which in cross section are not straight. It may also be desirable in some instances to have the sides of the channels other than substantially normal to the board positioning flanges.

While I have shown and described various embodiments of the present invention, these are for purposes of illustration and not limitation, and it is to be understood that various other modifications may be made without departing from the scope of the present invention.

I claim:

1. A hook nail frame comprising a pair of structural members having longitudinally extending angle portions with one side of each portion constituting a flange and the other a web, said angle portions being secured together with the flanges extending in opposite directions to form a bearing surface and said webs extending inwardly therefrom substantially normal to said flanges and slightly spaced apart to form a nail receiving channel therebetween, one of said webs being substantially narrower than the length of the nail portion intended to be driven into said frame, the inner edge portion of said narrower web being bent to extend in a direction substantially away from said other web to form a narrow ledge, said other web being wider and extending inwardly until substantially adjacent said ledge then continuing generally inwardly and across said channel forming a deflecting surface diverging from said ledge for causing a nail driven into said channel to hook about said ledge.

2. A hook nail frame comprising a pair of structural members having longitudinally extending angle portions with one side of each portion constituting a flange and the other a web, said angle portions being secured together with the flanges extending in opposite directions to form a bearing surface and said webs extending inwardly therefrom substantially normal to said flanges and slightly spaced apart to form a nail receiving channel therebetween, one of said webs being substantially narrower than the length of the nail portion intended to be driven into said frame, the inner edge portion of said narrower web being bent to extend in a direction substantially away from said other web to form a narrow ledge, said other web being wider and extending inwardly a slight distance beyond said ledge then continuing generally inwardly and across said channel in a substantially diagonal direction forming a deflecting surface for causing a nail driven into said channel to hook about said ledge.

3. A hook nail frame comprising a pair of structural members having longitudinally extending angle portions with one side of each portion constituting a flange and the other a web, said angle portions being secured together with the flanges extending in opposite directions to form a bearing surface and said webs extending inwardly therefrom substantially normal to said flanges and slightly spaced apart to form a nail receiving channel therebetween, one of said webs being substantially narrower than the length of the nail portion intended to be driven into said frame, the inner edge portion of said narrower web being bent to extend in a direction generally away from said other web and substantially parallel to said flanges to form a continuous longitudinal narrow ledge, said other web being wider and extending inwardly a slight distance beyond said ledge then continuing generally inwardly and across said channel in a substantially diagonal direction forming a deflecting surface for causing a nail driven into said channel to hook about said ledge.

4. A hook nail frame comprising a pair of structural members having longitudinally extending angle portions with one side of each portion constituting a flange and the other a web, said angle portions being secured together with the flanges extending in opposite directions to form a bearing surface and said webs extending inwardly therefrom substantially normal to said flanges and slightly spaced apart to form a nail receiving channel therebetween, one of said webs being substantially narrower than the length of the nail portion intended to be driven into said frame, the inner edge portion of said narrower web being bent to extend in a direction generally away from said other web and substantially parallel to said flanges to form a narrow ledge, said other web being wider and extending inwardly a slight distance beyond said ledge then continuing generally inwardly and across said channel in a substantially diagonal direction forming a deflecting surface for causing a nail driven into said channel to hook about said ledge, the angularity of said diagonal portion with respect to said webs being sufficient to cause the hooked portion of said nail to be forced against the free edge of said ledge.

5. A hook nail stud construction comprising a metallic channel-shaped structural member having a central web and edge flanges substantially normal thereto and a metallic structural angle member having a web and a flange substantially normal thereto, said members being secured together with the flange of said angle member and one of the flanges of said channel member coplanar and extending in opposite directions to form a bearing surface and said webs slightly spaced apart to form a nail receiving channel, the web of said angle member being substantially narrower than the length of the nail portion intended to be driven into said stud construction and having its inner edge portion bent to extend in a direction substantially away from said channel member to form a narrow ledge, and said channel member web extending inwardly a slight distance beyond said ledge then being bent inwardly and substantially diagonally across said channel forming a deflecting surface for causing a nail driven into said channel to hook about said ledge.

6. A hook nail stud construction comprising a structural channel member having a web with substantially opposed parallel flanges extending from the opposite edges thereof and a pair of structural angle members each having a web and a flange normal thereto, said members being secured together with the flanges of each angle member coplanar with and extending oppositely to a flange of said channel member and the webs of said angle members substantially parallel to and slightly spaced from the outer ends of said channel web forming nail receiving channels between said members, the webs of said angle members being substantially narrower than the length of the nail portions intended to be driven into said stud construction and having their inner edge portions bent to extend in a direction substantially away from said channel member to form continuous longitudinal narrow ledges, and said channel member web extending inwardly from the flanges thereof a slight distance beyond said ledges then being bent inwardly and substantially diagonally across said channels forming a pair of deflecting surfaces for causing nails driven into said channels to hook about said ledges.

7. A hook nail stud construction comprising a structural channel member having a web with opposed substantially parallel flanges extending from the opposite edges thereof and a pair of structural angle members each having a web and a flange normal thereto, said members being secured together with the flanges of each angle member coplanar with and extending oppositely to a flange of said channel member and the webs of said angle members substantially parallel to and slightly spaced from the outer edges of said channel web forming nail receiving channels between said members, the webs of said angle members being substantially narrower than the length of the nail portions intended to be driven into said stud construction and having their inner edge portions bent to extend in a direction substantially away from said channel member to form narrow ledges, and said channel member web extending inwardly from the flanges thereof a slight distance beyond said ledges then being bent inwardly and substantially diagonally across said channels forming a pair of deflecting surfaces for causing nails driven into said channels to hook about said ledges, the portion of said channel member web between said deflecting surfaces being offset with respect to the outer ends of said web.

8. A hook nail stud construction comprising a structural channel member having a web with opposed substantially parallel flanges extending from the opposite edges thereof, said flanges being substantially normal to said web adjacent thereto then extending inwardly toward each other and having their inner edge portions bent back toward said web forming narrow ledge portions, a pair of structural angle members, each having a web and a flange substantially normal thereto, said angle members being secured to the channel member with their flanges coplanar with the outer flange portions of said channel member forming bearing surfaces at opposite edges of the channel member and the webs of said angle members slightly spaced from the inwardly extending flange portions of the channel member forming nail receiving channels substantially normal to said bearing surfaces, the webs of said angle members extending inwardly a slight distance beyond said ledge then being bent diagonally toward said channel web across said nail receiving channels forming deflecting surfaces for causing nails driven into said channels to hook about said ledges.

9. A hook nail stud construction comprising a pair of similar structural channel members each having a web and opposed substantially parallel flanges at the edges thereof, said members being secured together with their flanges coplanar and extending oppositely to form a bearing surface at each end and said webs slightly spaced apart forming nail receiving channels therebetween, each of said channel members having a portion of its web extending inwardly a short distance from corresponding edges with longitudinal struck-out portions thereon bent to extend in a direction substantially away from the other web forming a narrow ledge portion, the opposite edge portion of each of said webs extending inwardly slightly beyond said ledges and having longitudinal struck-out portions bent inwardly and diagonally across said narrow channels forming a deflecting surface for causing nails driven into said channels to hook about said ledges.

10. A hook nail stud construction comprising a pair of similar structural channel members each having a web and opposed substantially parallel flanges at the edges thereof, said members being secured together with their flanges coplanar and extending oppositely to form a bearing surface at each edge and said webs slightly spaced apart forming nail receiving channels therebetween, each of said channel members having a portion of its web extending inwardly a short distance from corresponding edges with longitudinal struck-out portions thereon bent to extend in a direction substantially away from the other web forming a narrow ledge portion, said webs having openings inwardly of and adjacent said ledges, the opposite edge portion of each of said webs extending inwardly slightly beyond said ledges and having a struck-out portion bent inwardly and diagonally across said nail receiving channels and projecting through said openings in the other web forming a deflecting surface for causing nails driven into said channels to hook about said ledges.

11. A hook nail stud construction comprising a main structural member having a web and a flange portion at one edge substantially normal thereto, a structural channel member having a web and opposed substantially parallel flanges at opposite edges thereof, the web of said channel member being secured to the flange of said main structural member with the channel member flanges extending inwardly on opposite sides of said main member web, a pair of structural angle members each having a web and a flange substantially normal thereto, said angle members being secured to the inwardly extending flanges of said channel members with the webs of said angle members spaced a slight distance therefrom forming nail receiving channels and said angle flanges being coplanar with and extending away from said channel member web to form bearing surfaces, the inner edge portion of each of said angle member webs being bent back in the same general direction as their respective flanges forming narrow ledge portions and said channel member flanges extending inwardly a slight distance beyond said ledges and then being bent diagonally across said nail receiving channels and inwardly forming deflecting surfaces for causing nails driven into said channels to hook about said ledges.

12. A hook nail stud construction comprising a main structural member having a web and oppositely extending flange portions at the opposite edges thereof substantially normal thereto, a pair of structural channel members each having a web and opposed substantially parallel flanges at opposite edges thereof, the webs of said channel members being secured to the flanges of said main structural member with the channel member flanges extending inwardly on opposite sides of said main member web, structural angle members each having a web and a flange portion substantially normal thereto, one of said angle members being secured to each of the inwardly extending flanges of said channel members with the webs of said angle members spaced a slight distance therefrom forming nail receiving channels and the flanges of said angle members being coplanar with and extending away from the webs of said channel members to form bearing surfaces, the inner edge portions of each of said angle member webs being bent back in the same general direction as its respective flange forming a narrow ledge portion and the flanges of said channel members extending inwardly a slight distance beyond said ledges and then being bent diagonally across said nail receiving channels and inwardly forming deflecting surfaces for causing nails driven into said channels to hook about said ledges.

13. A hook nail stud construction comprising a main structural member having a web and a flange portion at one edge substantially normal thereto, a structural channel member having a web and opposed substantially parallel flanges at opposite edges thereof, the web of said channel member being secured to the flange of said main structural member with the channel member flanges extending inwardly on opposite sides of said main member web, a pair of structural angle members each having a web and a flange normal thereto, said angle members being secured to the inwardly extending flanges of said channel members with the webs of said angle members spaced a slight distance therefrom forming nail receiving channels and said angle flanges being coplanar with and extending away from said channel member web to form bearing surfaces, the inner edge portion of each of said angle member webs being bent back in the same general direction and substantially parallel to their respective flanges forming narrow ledge portions and said main member flanges extending inwardly a slight distance beyond said ledges and then being bent diagonally across said nail receiving channels and inwardly forming deflecting surfaces for causing nails driven into said channels to hook about said ledges.

References Cited in the file of this patent

UNITED STATES PATENTS

| Number | Name | Date |
|---|---|---|
| 1,964,403 | Loucks | June 26, 1934 |
| 2,257,338 | Hull | Sept. 30, 1941 |
| 2,276,040 | Hull | Mar. 10, 1942 |
| 2,454,604 | Heim | Nov. 23, 1948 |